Nov. 8, 1932.   R. O. HENDRICKSON   1,887,351
TRACTOR
Original Filed May 2, 1931

INVENTOR.
ROBERT O. HENDRICKSON
BY James A. Walsh,
ATTORNEY

Patented Nov. 8, 1932

1,887,351

UNITED STATES PATENT OFFICE

ROBERT O. HENDRICKSON, OF RACINE, WISCONSIN, ASSIGNOR TO J. I. CASE COMPANY, OF RACINE, WISCONSIN, A CORPORATION

TRACTOR

Continuation of application Serial No. 534,551, filed May 2, 1931. This application filed February 15, 1932. Serial No. 593,052.

In the operation of tractors in orchards and terrain where obstructions are frequently encountered, it is desirable to control the direction of travel so that quick short turns of the tractor may be made, as well as varying ranges of turning, to avoid trees, plants and obstacles, and it is my object to provide simple and effective means under convenient and instant control of the tractorman whereby gradual and quick short turning may be accomplished under the conditions stated, as will further hereinafter appear, my present application being a continuation of application Serial No. 534,551 filed by me May 2, 1931.

Figure 1:
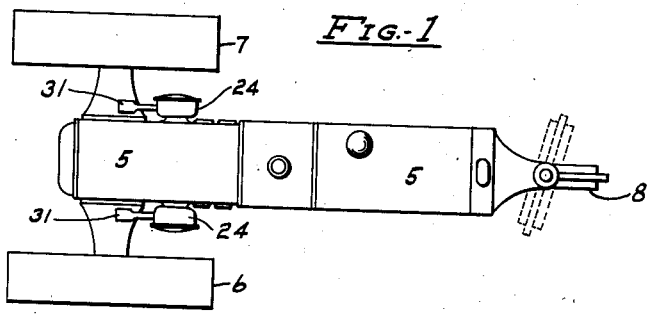
Figure 2:
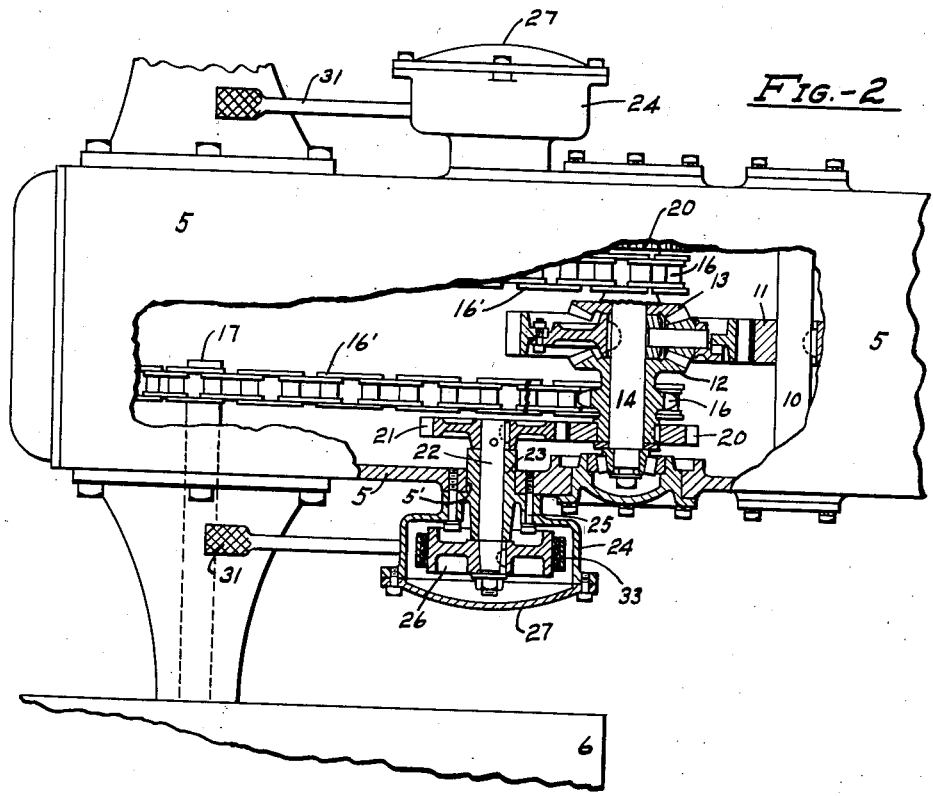
Figure 3:
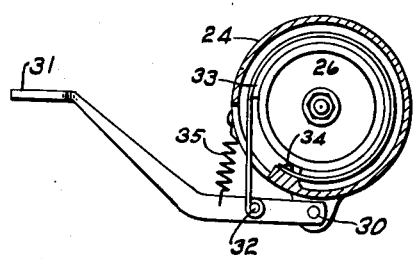

In the accompanying drawing, forming part hereof, Figure 1 is a plan view of a tractor, the range of movement of the steering wheel being indicated in dotted lines; Fig. 2, an enlarged fragmentary plan showing the mechanism employed for my purpose; and Fig. 3 is an elevation of a brake and operating mechanism therefor which I may employ.

In said drawing the numeral 5 indicates a tractor body, 6 and 7 the driving wheels, and 8 the front or steering wheel, all of which parts may be of any conventional construction and arrangement. Driving gear of any desired arrangement may be employed such as the shaft 10 having a gear 11 engaging the differential comprising, as is common, the two independently rotatable gear sets 12, 13, the shaft 14 of which carries sprockets 16 connected to the rear axle sections 17 by chains 16' for driving the wheels 6 and 7, which is a common and well known construction. On each end of the differential gear sets 12 and 13 I mount spur gears 20 enclosed within the tractor body and each of which engages a brake-driving gear 21 mounted on the shaft 22 seated in a sleeve bearing 23 forming part of a brake casing 24, the latter being removably secured to the tractor by screws 25 as indicated in Fig. 2, or otherwise. Within the brake casing 24 I mount a brake-wheel 26 on shaft 22, which brake is enclosed by a cap 27 for excluding dust and débris and maintaining the brake mechanism in dry condition. Pivotally mounted on the brake casing, at 30 Fig. 3, is a treadle 31 to the lower end of which, at 32, one end of a brake-band 33 is secured and which substantially encircles the brake-wheel 26, its opposite end being connected at 34 to the casing, as indicated in Fig. 3, said treadle being yieldingly controlled by the spring 35. The brake equipment described is installed at each side of the tractor, and as they are counterparts it is but necessary to describe one of said structures in detail. It will be further understood that the body 5, Fig. 2, is provided with an opening 5' at each side through which the bearing 23 may be inserted, said openings being normally closed by removable covers (not shown), so that said brake equipment when not forming part of a tractor as constructed originally may be subsequently readily installed as desired.

In operation, it will be understood that the tractorman, as usual, steers the tractor by manipulating an ordinary steering rod (not shown), and when it is desired to make substantially long or quick and short turns as, for example, when turning about trees in an orchard, it is but necessary to depress the treadle at that side of the tractor about which the opposite drive-wheel is to pivot, whereupon the brake-band 33 will increasingly grip the brake-wheel 26, thus gradually slowing down that side of the tractor supported by the wheel 6, for example, so that the actuating mechanisms on the opposite side will propel the tractor to turn about said pivot wheel, the range of such turning being controlled by the degree of pressure of the brake-band 33 on brake-wheel 26, and when quick short turns are required this will be accomplished by tightening the grip of said band to such extent that the brake-wheel will cease rotation and consequently the gears 21 and 20, sprocket 16, chain 16', and drive-wheel axle section 17, will discontinue rotating. While this action is occurring the tractor, by turning the steering-wheel 8, will pivot about the drive-wheel rendered idle by the brake, and make quick short turns. It will therefore be understood that by manipulating the treadles frequent long and short turns of the tractor in different directions can be made at will, and the turning ranges thereof governed by the depressions and releases of the respective treadles for controlling the differential sections with which they are associated. By providing a brake actuated from the interior of the tractor and extending outwardly to be conveniently controlled by an operator the assemblage of a brake of a comparatively compact and effective character is available and which, as indicated, may be readily installed as an attachment to tractors in use as well as when originally constructed.

I claim as my invention:

1. In a tractor including a differential and a shaft driven thereby, a spur-gear mounted on the differential shaft, a brake-wheel positioned exteriorly of the tractor, a casing enclosing the wheel, a shaft supporting the wheel and extending into the tractor, a gear on the inner end of said shaft engaging the spur-gear and driven thereby, a brake-band surrounding the brake-wheel, and a treadle on the casing to which the band is connected whereby the band may be adjusted to prevent actuation of the wheel and the rotatable parts associated therewith.

2. In a tractor, the combination, with a differential having a shaft, a spur-gear on the shaft, a brake-wheel shaft mounted on the tractor, a gear on said latter shaft engaging said spur-gear, said gears being positioned interiorly of the tractor, a casing mounted exteriorly of the tractor through which said brake-wheel shaft extends, a brake-wheel on the latter shaft, a brake engageable with said wheel, and means under control of an operator for applying and releasing said brake to control the turning of the tractor.

3. In a tractor having an opening in its side, a unitary brake casing and sleeve-bearing insertible in the opening, means for removably securing said unitary structure in position, a shaft mounted in the bearing and projecting beyond the inner and outer ends thereof, a gear on the inner end of the shaft, means for actuating the gear to rotate the shaft, a brake-wheel on the outer end of the shaft and enclosed in said casing, and means for controlling the brake-wheel whereby the rotation of said gear and parts associated therewith may be stopped and resumed.

4. In a tractor having an opening in its body, a sleeve insertible in said opening, a casing associated with the sleeve and positioned exteriorly of the body said casing having a removable closure, means for securing the casing to the body, a shaft mounted in the sleeve and projecting beyond the inner and outer ends thereof, a gear on the inner end of the shaft, means for actuating the gear to rotate the shaft, a brake-wheel on the outer end of the shaft and enclosed in said casing, a brake-band connected to the casing and encircling the wheel, a treadle, and means for connecting the opposite end of the band to the treadle whereby said band may be adjusted to control the rotation of the brake-wheel and parts associated therewith.

In testimony whereof I affix my signature.

ROBERT O. HENDRICKSON.